G. C. CLARK.
ELECTRIC TYPE WRITING TELEGRAPH APPARATUS.
APPLICATION FILED FEB. 28, 1910.
Patented Jan. 12, 1915.
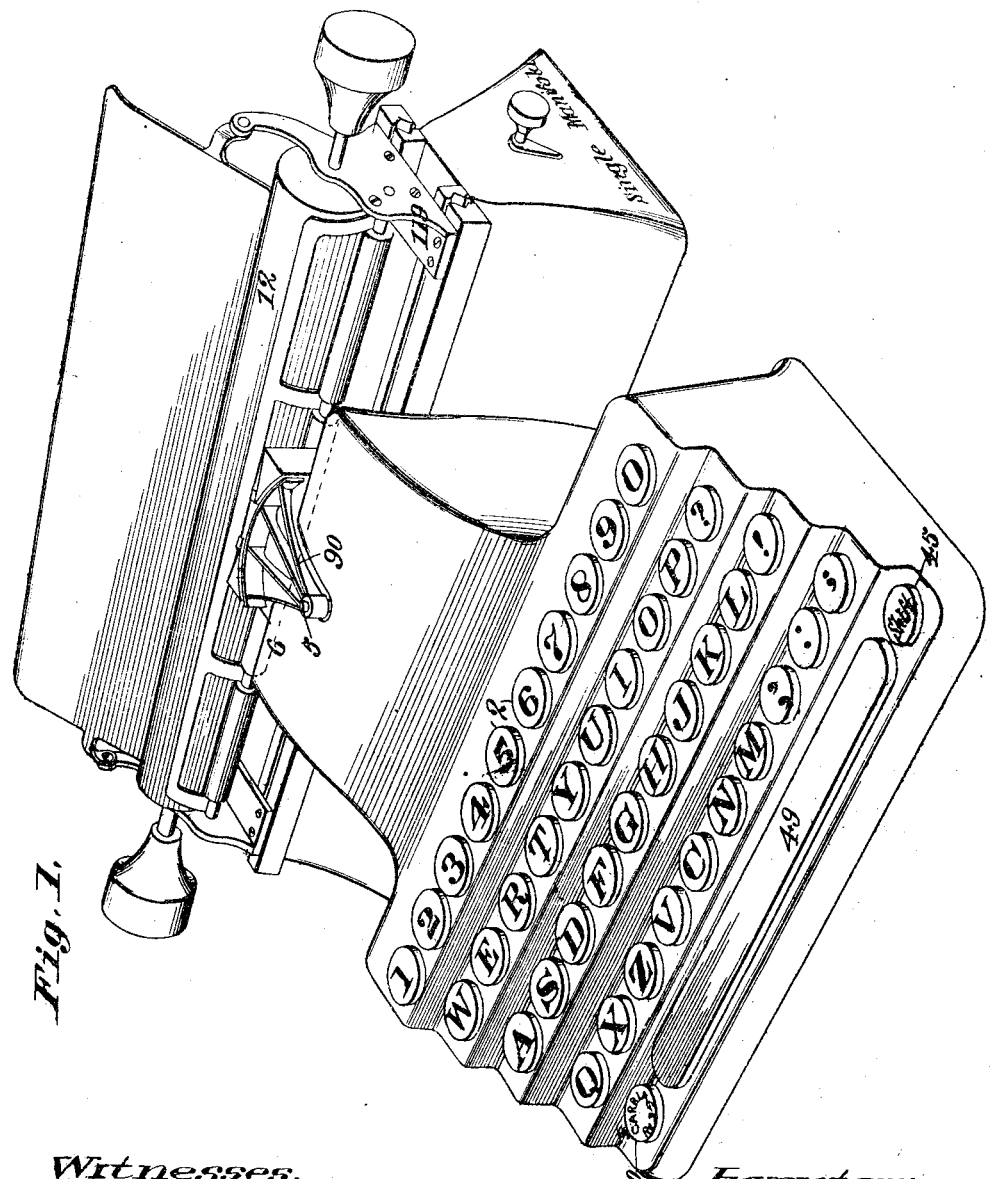

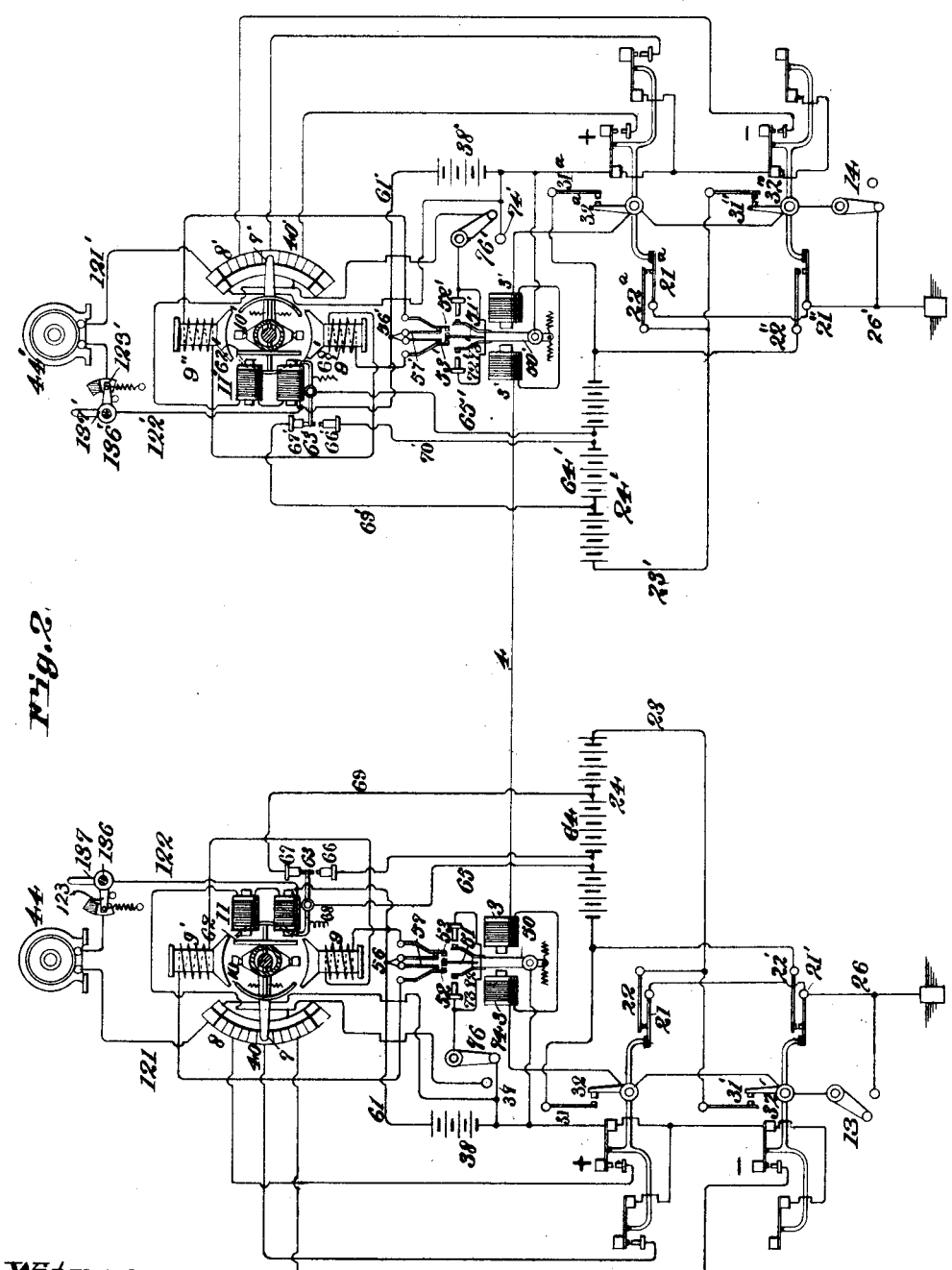

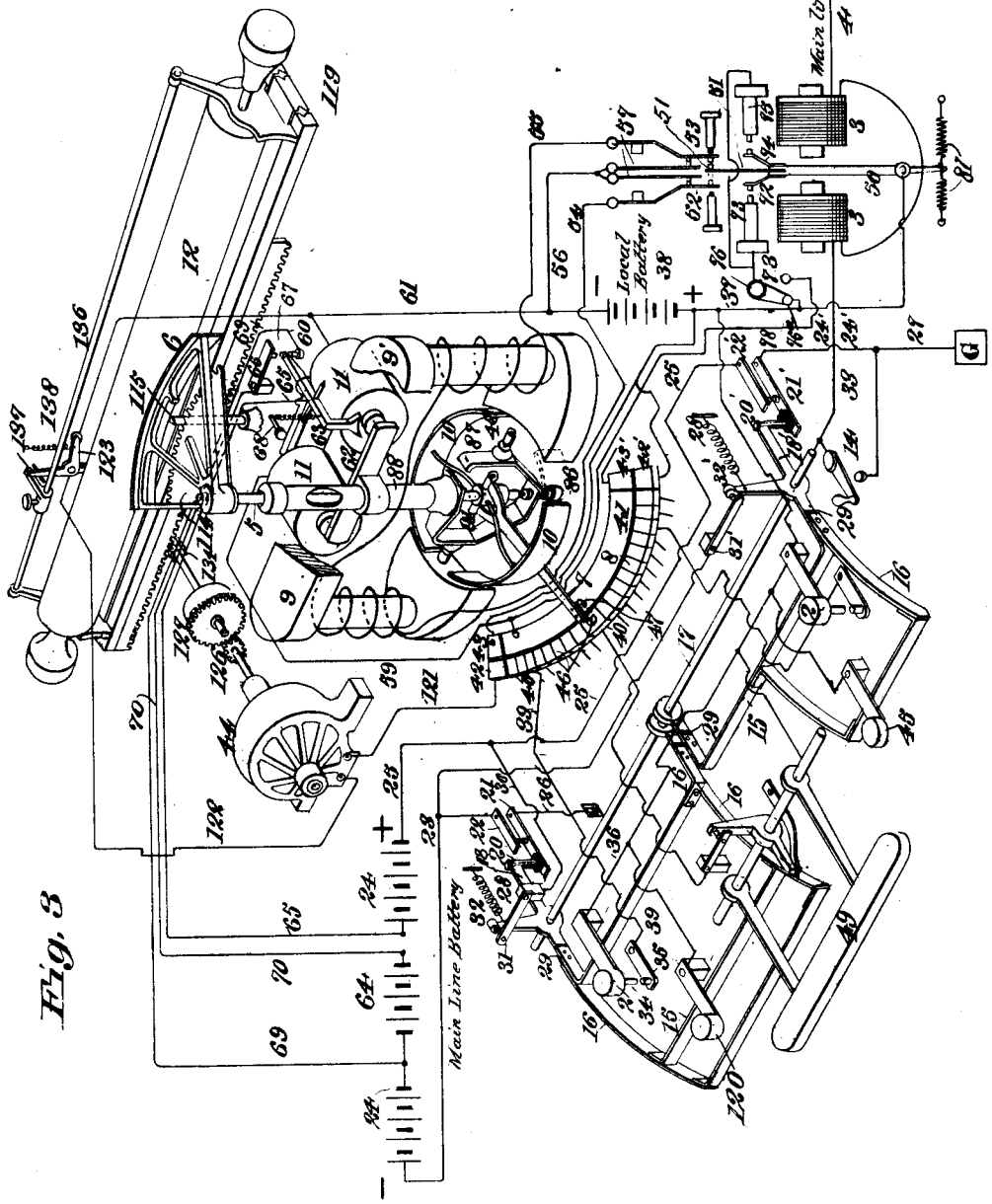

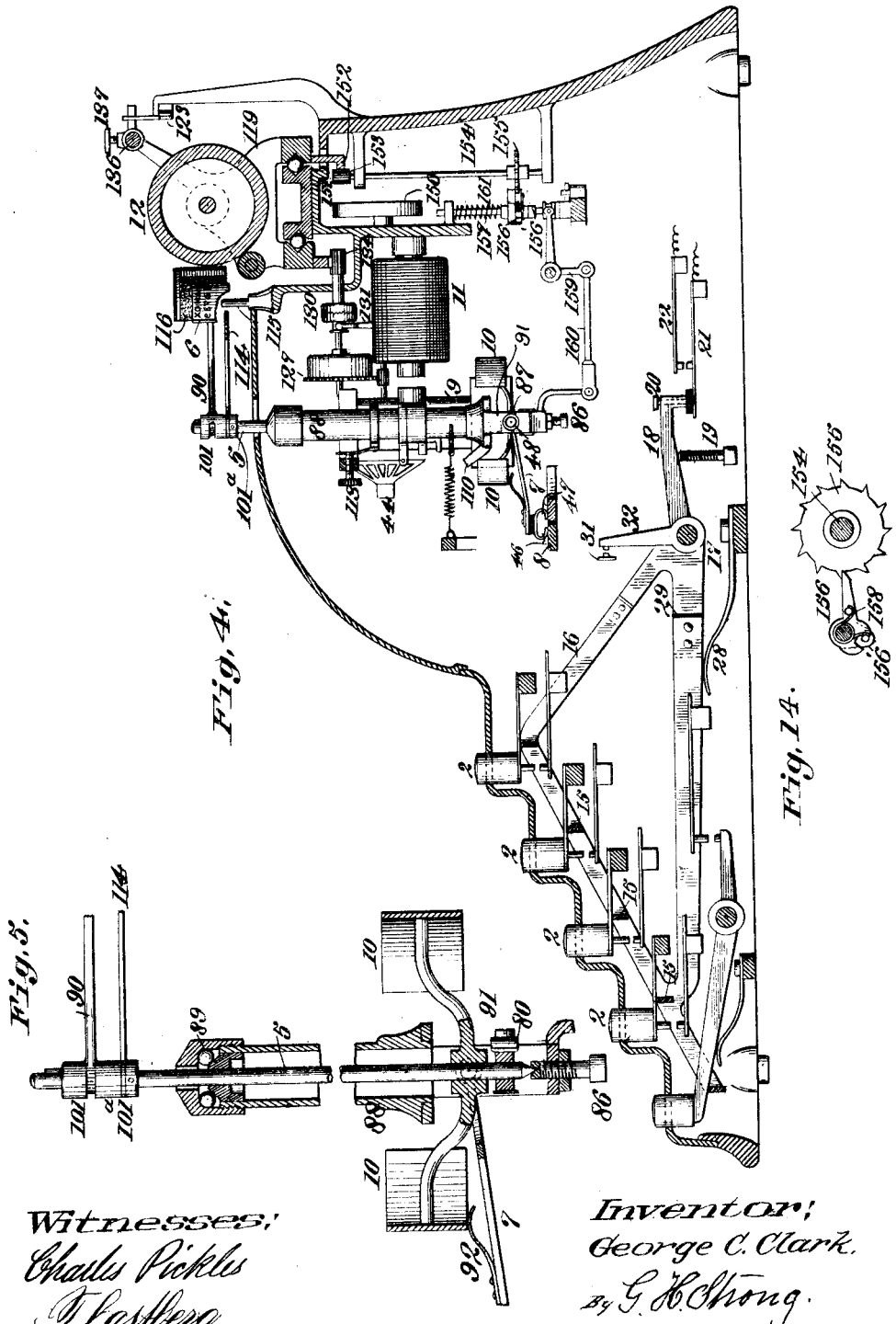

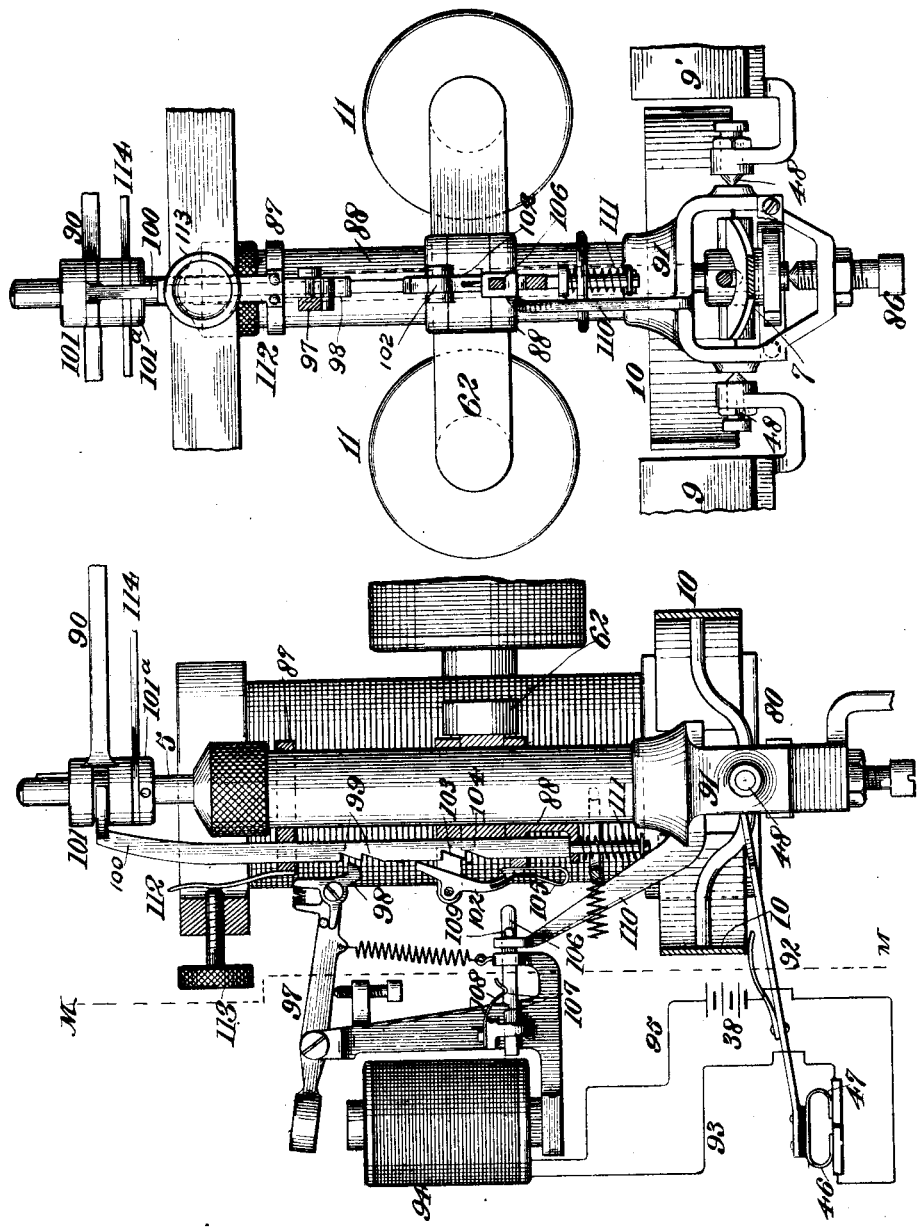

G. C. CLARK.
ELECTRIC TYPE WRITING TELEGRAPH APPARATUS.
APPLICATION FILED FEB. 28, 1910.
1,124,704.
Patented Jan. 12, 1915.
8 SHEETS—SHEET 6.
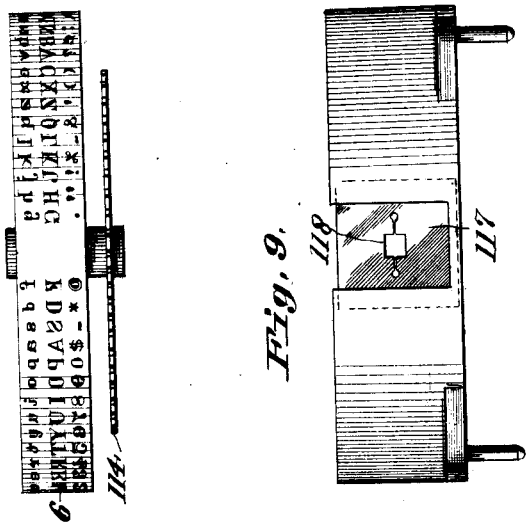
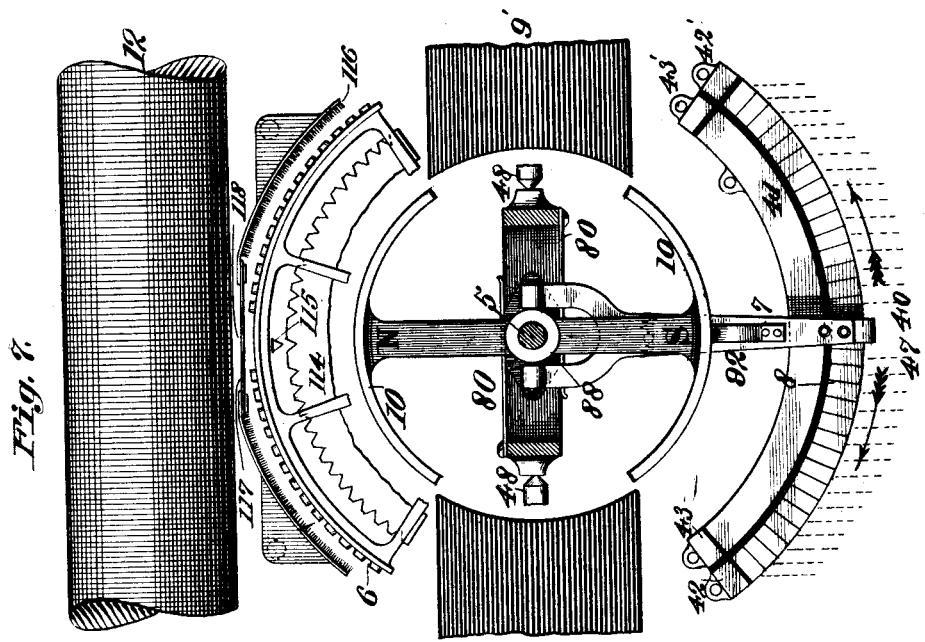
Witnesses:
Charles Pickles
J. Hastberg
Inventor:
George C. Clark
By G. H. Strong
Atty

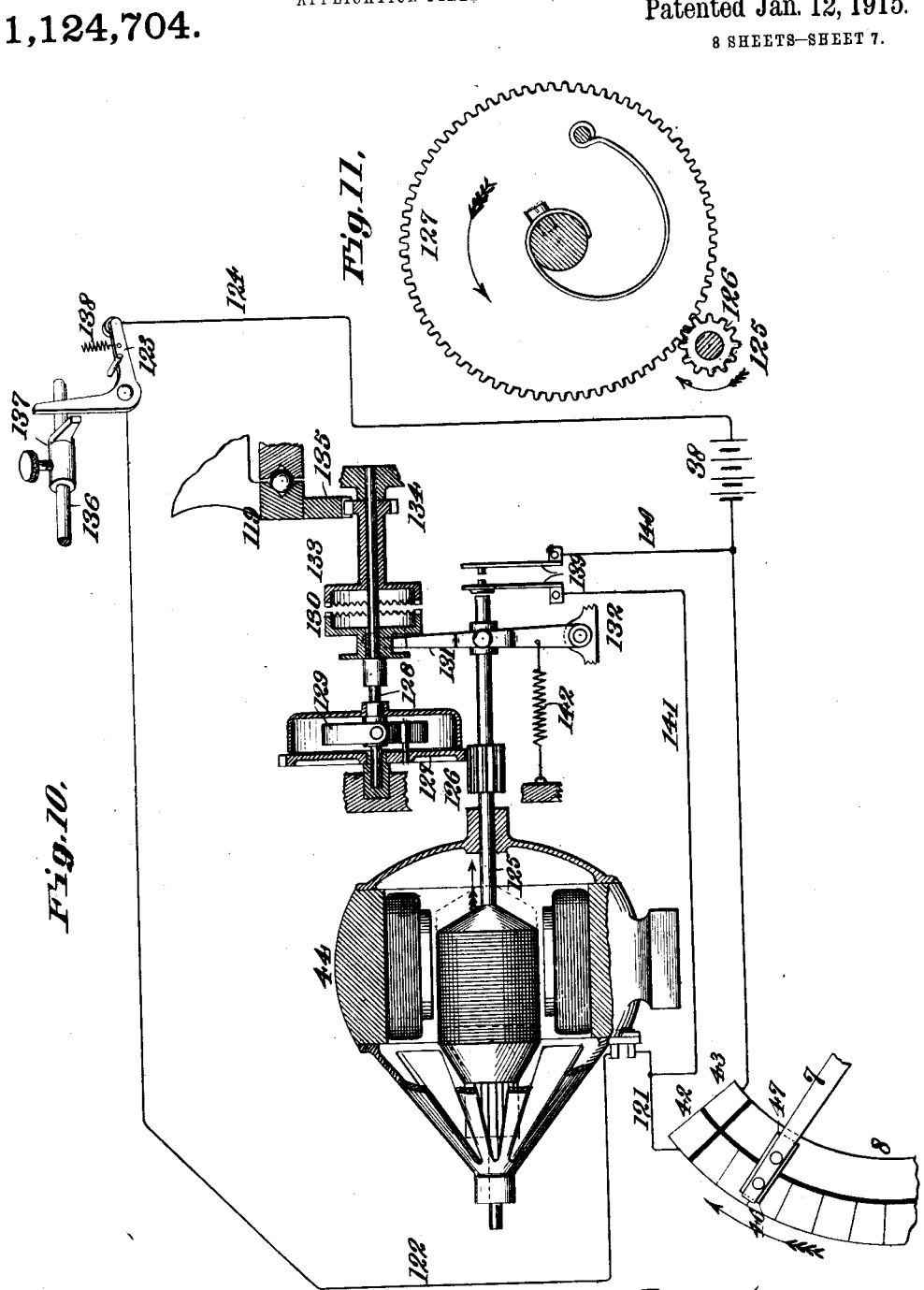

G. C. CLARK.
ELECTRIC TYPE WRITING TELEGRAPH APPARATUS.
APPLICATION FILED FEB. 28, 1910.
1,124,704.
Patented Jan. 12, 1915.
8 SHEETS—SHEET 8.
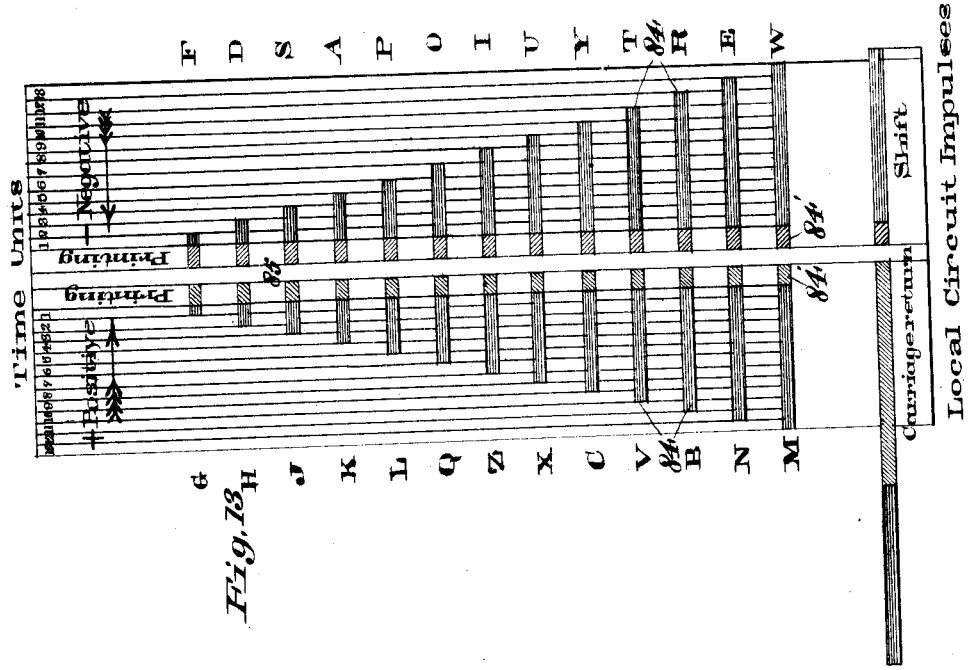
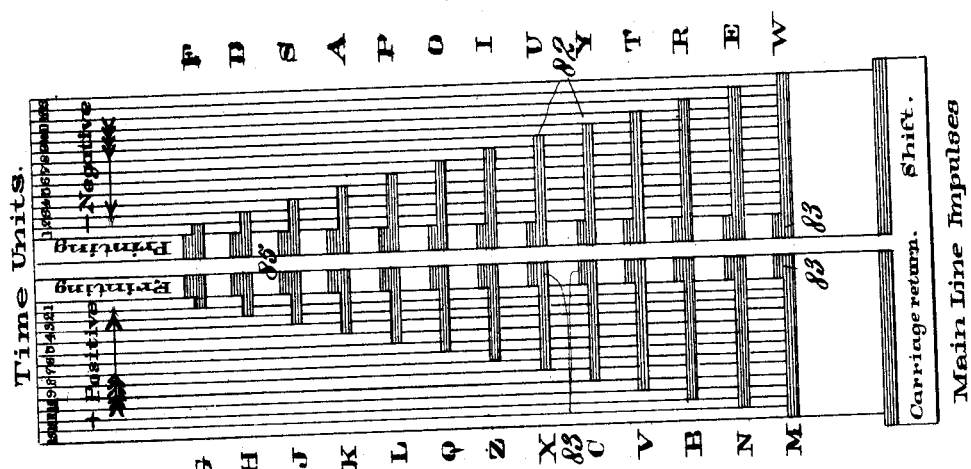
Witnesses
Charles Pickles
T. Eastberg.
Inventor:
George C. Clark.
By G. H. Strong,
Atty

UNITED STATES PATENT OFFICE.

GEORGE C. CLARK, OF FRUITVALE, CALIFORNIA, ASSIGNOR OF FOUR-FIFTHS TO W. H. MAXSON, OF OAKLAND, CALIFORNIA, AND CHARLES A. GRAHAM, OF NEVADA CITY, CALIFORNIA.

ELECTRIC TYPE-WRITING TELEGRAPH APPARATUS.

1,124,704.   Specification of Letters Patent.   Patented Jan. 12, 1915.

Application filed February 28, 1910. Serial No. 546,424.

*To all whom it may concern:*

Be it known that I, GEORGE C. CLARK, citizen of the United States, residing at Fruitvale, in the county of Alameda and State of California, have invented new and useful Improvements in Electric Type-Writing Telegraph Apparatus, of which the following is a specification.

My invention relates to an electrical type-writing machine and telegraphic transmitting and receiving apparatus.

The object of the invention is to provide a page printing telegraphic machine combining in a single instrument the features of transmitter, receiver and recorder, and arranged to operate through a relay over a one wire circuit.

The invention consists of the parts and the construction and combination of parts as hereinafter more fully described and claimed, having reference to the accompanying drawings, in which—

Figure 1 is a perspective view of the typewriting machine employed in the system. Fig. 2 is a schematic view representing the system. Fig. 3 is a perspective view, partially diagrammatic, of the operating parts and electrical circuits of said machine. Fig. 4 is a cross-section through the same. Fig. 5 is a detail in vertical section of the oscillating type-bar. Fig. 6 is an elevation of the type-bar and shifting mechanism. Fig. 6ª is a sectional view on the line M—M of Fig. 6. Fig. 7 is a top plan view of the printing plate and commutator segment, with certain parts of the apparatus broken away. Fig. 8 is a front view of the type segment or printing plate. Fig. 9 is a back view of the inking pad. Fig. 10 is a view in partial section, partially diagrammatic, of the carriage-return mechanism. Fig. 11 is a detail of the loose spring gear forming part of the device shown in Fig. 10. Fig. 12 is a diagram representing the main line impulses. Fig. 13 is a diagram representing the local circuit impulses. Fig. 14 is a detail of the letter spacing mechanism.

In the embodiment of the invention, I employ a machine A, such as represented in Fig. 1, more in detail in Figs. 3 and 4, and which machine is provided with the usual standard arranged keyboard having the keys 2, each key of which is an electrical switch which controls the operation and recording of the transmitting machine, and simultaneously transmits through the relay 3 to the line 4 the necessary currents that automatically control the receiving machine at the opposite end of the line. It will be understood that the sending and receiving machines are precisely alike, and interchangeable, as will be hereinafter more particularly pointed out.

The principal structural features of the invention involve, in addition to the keyboard mentioned, a universal, oscillating, rocking type-bar 5 which carries a segmental printing plate 6, and is also provided with a traveling spring contact arm 7 operative over a segmental commutator surface 8; the number of the commutator sections of the segment 8 corresponding to the number of keys on the key-board, and each of which sections is in direct electrical communication with a key on the keyboard.

9—9' represent opposed field magnets for oscillating the type-bar. 10 are corresponding armatures for the magnets 9—9' carried by the type-bar 5.

11 is a printing magnet for rocking forward the type-bar to cause the type-face on segment 6 to print on the platen 12.

Means for shifting vertically the type-bar, to enable different cases on the type-face to print, will be described later, as will likewise the carriage-return, automatic inking of the type-face, and other details of the machine.

13—14 are electrical switches for changing the instrument from transmitter to receiver, and vice versa.

The electrical principle of control which I employ is a single impulse from the main line battery, or other source of energy, of either positive or negative polarity, and of variable duration and of two strengths, first weak and then strong; one strength to prepare the system for printing, and the other strength to effect the printing. That is to say, starting with a weak strength, the first part of the current impulse sent over the main line 4 will be either of positive or negative polarity, according to the position of the key depressed on the keyboard; all keys on the left hand of the center of the keyboard being adapted to send positive impulses to the line, and all keys to the right of the center of the keyboard to send negative impulses to the line. If the initial weak current is of positive polarity, it first passes through the coils of the relay 3, and thence out over the line through the coils of the receiving relay 3', Fig. 2, thence to ground, returning to the negative pole of the main line battery at the sending end of the system. If the current is of negative polarity the direction is reversed, and the current goes first to the ground and returns by way of the relays to the positive pole of the battery at the sending end of the machine. The action of this first weak part of impulse in the relays of both instruments is to close a local battery circuit of the same polarity as the main line, energizing the positioning fields 9—9', and turning the type segments of both sending and receiving machines in unison to the proper position directly in front of the platen on both machines; in so doing, moving the arm 7 of each machine to right or left, according to negative or positive local impulses sent, across the commutator 8. The moment, however, the brushes on the arm 7 come into contact with the commutator segment on its respective commutator corresponding to the key depressed, there is instantly established a shunt circuit from the local battery in the transmitting machine that energizes the printing magnet 11 in the sending machine, and at the same moment cuts in an extra battery to the main line, thus raising the current of the main line impulse from weak to strong. Simultaneously there is a further action in the relays 3—3' due to this reinforced or extra main battery current passing through the main line, and a circuit is established from the local battery of the receiving machine through an extra or shunt circuit to the printing magnet of the receiving machine, energizing the said printing magnet and tilting or rocking forward the universal type-bar, and causing its type-face to print against the platen of the receiving machine; printing the same character represented by the key depressed in the sending machine.

This in a general way represents the operation of my system, and I shall now describe more in detail the means by which these various circuits are established, and results produced. As before stated, the keys on the left hand of the center of the keyboard, when depressed, are adapted to send positive impulses to the main line wire 4, while all keys to the right of the center of the keyboard, when depressed, are adapted to send negative impulses to the line. The reason for this division will be apparent hereinafter. For convenience, I shall refer to the keys on the left as the positive keys, and the keys on the right of the keyboard as the negative keys. Each bank of keys 2, as shown in Fig. 4, acts on a universal bar 15, and all these bars 15 for one-half of the keyboard are secured in end frames, one of which is shown at 16, Fig. 4; each pair of end frames 16 fulcruming on a rod 17 which extends across the machine. That is to say, all the positive or left-hand keys act on one set of universal bars 15 carried by their individual frame, and all the negative or right-hand keys act on another set of universal bars 15 carried by their individual frame; so that no matter which right-hand or left-hand key is depressed, it will act through one or the other of its universal bars 15 to rock a respective frame and correspondingly close certain main line battery circuits. Each of these frames carries a projecting arm (this arm being marked "18" for the positive or left-hand keys, Fig. 3, and "18'" for the negative or right-hand keys); the movement of each arm being limited by a set-screw 19, Fig. 4. Each arm 18—18', Fig. 4, carries an insulated adjusting screw 20—20' which acts on one member 21 or 21' of a switch interposed in the main line battery circuit. The other member of this switch is represented at 22 on the left hand of Fig. 3, and by 22' on the right hand of Fig. 3; the switch member 22 being connected by wire 23 with the negative pole of the main line battery 24, and the switch member 22' being connected by the wire 25 with the positive pole of the main line battery 24. The switch members 21—21' are grounded by the respective wires 26—27. Each pair of contacts 20—21, 20'—21' are normally held apart by suitable means, as the springs 28, acting on the frames 16 to lift the latter when pressure is released on the key. Each of these frames 16 with its universal bars 15 is independently operable to close a respective circuit and send a negative or positive impulse over the main line wire. All the universal bars 15 on the left-hand side of the machine are insulated from the rest of the machine by suitable means, as by interposing in the frame 16 at some point between the bars 15 and fulcrum 17, a suitable insulation 29. The universal bars on the right-hand side of the machine are similarly insulated from the rest of the machine.

The positive end of the main line battery 24 is connected through wires 25—30 with a contact 31 which is arranged in the path of a contact member 32 carried on the rocking frame 16 on the positive or left-hand side of the machine. This contact 32 is in electrical connection with the fulcrum rod 17, and this fulcrum rod 17 is electrically connected by the wire 33 leading to the coils of the relay 3 in the main line 4. Correspondingly the negative side of the main line battery 24 is connected by the wire 23 with a contact 31', which latter is in the path of a contact 32' carried by the right-hand or negative rocking frame 16. Hence it will be seen that each key 2 on the left-hand side of the machine, when depressed, will cause its rocking frame 16 to close two switches, one at 21—22, and the other at 31—32; and similarly, the depression of a negative or right-hand key will close two switches of the main line battery circuit at 21'—22', 31'—32'. Each positive key 2, when depressed, partially closes another circuit at the contacts 34—35; the contact 34 being carried by the key, and the key being in electrical connection by a wire 36 which leads to the wire 37 on the positive side of the local battery circuit, the local battery being represented at 38. The contact 35 for this particular key is connected by a wire 39 with conducting section 40 on the commutator segment 8. The number of these conducting sections on this segment corresponds to the number of keys on the keyboard, and each section 40 is insulated from every other section and from the main metallic portion 41 of the segment. At each end of the segment 8 are two insulated sections 42—43, 42'—43', sections 42—43 and 42'—43' being insulated one from the other and from the rest of the segment. One pair of these sections 42—43 are for the purpose of operating the motor 44 which effects the carriage return, and the other pair of these sections 42'—43' connect with the shift-key 45 on the keyboard, by which the position of the type segment 6 is shifted vertically. The operation of this type shift and the carriage return will be described later.

The swinging arm 7 which is carried by the universal type-bar 5 has two brushes 46—47, one of which, 46, is adapted to travel in electrical contact over the sections 40—42—42', and the other brush, 47, to travel over the rear metallic contact sections 41—43—43'. Normally the arm 7 stands on the center section 40 of the segment, as shown in Fig. 3, which is a neutral position, and when this arm 7 is in this central, neutral position, if the bar 5 should be rocked forward on its pivots 48 the type-face on the printing plate 6 would not print; this being the position of the parts when the spacer-bar 49 is struck. Whenever the arm 7, however, is swung to right or left, so as to stand on one or other of the sections 40, and a circuit is closed through a section 40, brushes 46—47, and plate 41, the bar 5 will be rocked forward on its pivots 48 to cause the type on the printing plate 6 to print; all as will be more clearly understood shortly.

The turning of the type-bar 5 to right or left to carry the arm 7 over the commutator segment 8 depends on whether a right-hand or left-hand key is depressed. The closes a circuit to rock the armature 50 of the relay 3 to the left. Depressing a negative or right-hand key turns the arm 7 to the right. Thus, referring to Fig. 3, when a left-hand or positive key 2 is depressed, switches 31—32 and 21—22 are closed, and the main line circuit through battery 24 is closed, the current flowing from the positive end of the battery 24 through wires 25—36, switch 31—32, bar 17, wire 33, to relay 3, out over the main line to ground in the receiving machine, up through the ground wire 26 in the sending machine, Fig. 3, through switch 21—22 and wire 23 to the negative end of the battery 24. If a right-hand or negative key 2 is depressed, the main line circuit is closed by the switches 21'—22', 31'—32', and the current passes from the positive end of the battery 24 through wire 25, switch 22'—21', wire 27, to ground, and returns over the main line 4, through the relay 3, wire 33, switches 32'—31', and wire 23, to the negative end of the battery. Thus it will be seen that by depressing a left-hand or positive key, a positive impulse is sent over the main line and the return is through ground, while if a right-hand or negative impulse controlling-key is depressed, the current goes from the receiving machine through the ground and returns over the main line as a negative impulse. If a positive impulse is sent out over the line by the depression of a positive or left-hand key 2, the armature 50 of the relay 3, which is of the polarized type, is rocked to the left. If a negative or right-hand key is depressed, the reverse travel of the current through the main line 4 will correspondingly rock the armature 50 to the right.

The rocking motion to the right or left of the arm 7 on the universal bar 5 is controlled by the right or left movements of the armature 50, and the printing by the machine due to the forward oscillation of the type-bar 5 on its pivots 48 is effected in the receiving machine by intensifying at the proper moment the current passing through the main line, so as to move the armature 50 farther than normally to right or left, which will also be apparent later.

The armature 50 has a spring tongue extension 51, with its points normally out of contact with, but movable between, a pair of contacts 52—53, to which the wires 54—55 leading to the field magnets 9—9' connect. The relay armature 50 connects by the wire 37 with the positive end of the local battery 38. The negative pole of this local battery 38 connects by a wire 56 with a pair of spring contacts 57. Ordinarily in the arrangement shown in Fig. 3, the negative pole of the local battery 38 is electrically connected with both terminals 52—53 by means of the contacts 57 and wire 56;

but a movement in one direction or the other of the armature 50 will cause the spring tongue 51 to contact with one or the other of the terminals 52—53, breaking its connection with 57, but closing the local battery circuit through the armature and spring tongue 51. So if a positive impulse is sent out over the main line, armature 50 is rocked to the left, and the local battery circuit is closed, through wire 37, armature 50, spring tongue 51, contact 52, wire 54, left-hand field magnet 9, right-hand field magnet 9', wire 55, contact 53, contact 57, wire 56, to negative pole of local battery 38. This energizing of the field magnets by a positive impulse rocks the arm 7 to the left, causing the brush 46 on the arm 7 to travel over the commutator sections 40 lying to the left of the center of the segment. Similarly, the depression of a right-hand or negative key on the keyboard to cause a negative impulse to traverse the main line results in the rocking of the armature 50 to the right, closing the local battery circuit through wire 37, armature 50, spring tongue 51, contact 53, wire 55, magnets 9'—9, wire 54, contacts 52—57, wire 56, to the negative pole of the local battery; the field magnet armature 10 being correspondingly attracted, and the arm 7 moved to the right. Thus it is seen that the oscillation of the field armatures 10 and arm 7 is controlled primarily by the switches 21—22, 31—32, or 21'—22', 31'—32'; while the printing magnet is controlled by the key switch 34—35 or 34'—35'.

If the arm 7 moves to the left its movement continues in that direction until the brush 46 comes over the section 40 which corresponds to the key depressed. Immediately thereupon a circuit is closed as follows, assuming that a left-hand or positive key has been depressed: from key 2 through wires 36—37, to positive pole of local battery 38. The local battery current passes through these two wires, through the key 2, complementary contacts 34—35, wire 39, section 40, brushes 46—47, rear section 41 of segment 8, wire 59, to printing magnet 11, thence through wires 60—61 to the negative end of the local battery circuit. This completing of the circuit through the printing magnets 11 by closing the switch 34—35 immediately results in the attraction of an armature 62 surrounding and in which the universal type-bar 5 turns, causing the type-bar to rock forward and print. If a negative or right-hand key is depressed, the operation is similar, except that the field magnet armature 10 and arm 7 are rocked in the opposite direction. The moment, however, that the printing coils 11 are energized by the closing of the switch 34—35 and before the universal type-bar 5 of the sending machine can rock forward, a sensitive armature 63 is attracted by one of these coils, this armature, 63 being so constructed as to break a short circuit in the main line and to cut in extra cells, 64, in the main line battery, so that a strong impulse will be sent out over the line for the purpose shortly to be described.

As seen in Fig. 3, the shunt circuit controlling armature 63 is connected by wire 65 with the negative end of a set of cells in the battery 24. This armature is also one member of a switch which is movable between a pair of contacts 66—67. Normally a spring 68 holds the armature 63 in contact with the switch member 67, breaking it with member 66. Contact member 67 is connected by a wire 69 with the positive end of another set of cells in the main line battery. Thus it will be seen that ordinarily the set of cells 64 is cut out, and the current that passes through the main line battery passes around the cells, 64, through wire 69, contact 67, armature 63, and wire 65. The contact 66 with which the armature 63 coacts when coil 11 is energized, is connected by a wire 70 with one terminal of the set of cells 64, so that it is seen that energizing coil 11, attracts armature 63 and breaks the shunt circuit through wires 69—65 and cuts in the extra set of cells 64, so that the strength of current that can pass over the main line will be equal to all the cells in the battery; the course of the current through the battery now being over wire 70, contact 66, armature 63, and wire 65. The effect of thus cutting in the extra set of cells 64 is to cause a sudden intensification of the current passing over the main line 4, and the effect of this intensified current reacts through the relay coils 3', Fig. 2, of the sending machine to attract its armature 50', Fig. 2, farther toward one or the other of the magnets 3', according to whether the impulse sent over the main line is negative or positive.

As before stated, if a left-hand key is depressed to send a positive impulse over the main line wire, the armatures 50 and 50' of the sending and receiving machines would be rocked to the left. This rocking of the armature to the left by reason of the current passing over the main line, so long as the extra set of cells 64 is out of commission, results only in the closing of the local battery circuit to energize the positioning fields of the two machines and start the commutator arm 7 swinging in the correct direction. The moment, however, that the extra set of cells 64 is cut in, the intensified current passes through the relays of both the machines, and causes the armatures 50 and 50' of both machines to be more strongly attracted, so that the spring tongues 51—51' (which we will assume are already in contact with contacts 52—52') bends and causes a contact 72 on the stiff part of the armatures to engage a corresponding fixed contact 73. Each armature 50—50' carries a left-hand contact member 72 and a right-hand contact member 74 coacting with corresponding fixed contacts 73—75. The contacts 73—75 in each machine are connected together and to a switch member 76—76'. In the sending machine of Fig. 3, the switch member 76 is shown as thrown on the contact 76ᵃ which is connected with wire 37 of the local battery 38. Such is the position of the switch member 76 in the sending machine at the left of Fig. 2. In Fig. 2, the receiving machine at the right shows its switch member 76' thrown in the opposite direction, or off. In each machine the button of switch member 76 or 76' is connected by a wire 78 with the wire 59, which latter has been described as connected with the electrical conducting segment 41 of the commutator 8.

It will be manifest that the moment an impulse is sent over the main line 4, so as to rock the armature 50' of the receiving machine to the left, the local battery circuit leading to the printing magnets 11' is closed by the switch 72—73. The moment these magnets 11' are energized, the universal type-bar of the receiving machine is rocked forward to print just as has been described in conjunction with the sending machine. The purpose of this additional strength current through the main line to cause the spring arm of the armature 50' of the receiving machine to bend, so as to bring the contacts 72—73 of the receiving machine together, is to cut in the printing magnets of that machine automatically; this cutting in or closing of the printing magnet circuit in the sending machine being done by the manual closing of the switch 34—35. In other words, in the sending machine the local circuit leading to the printing magnets 11 is closed at 34—35 by depressing the key. The same circuit in the receiving machine has to be done automatically, and I adopt the means of the spring tongue 51 and contacts 72—73 and 74—75 to accomplish this. Of course, it is understood that both machines are precisely alike and interchangeable, and are to be used interchangeably, and while the spring arm 51 of the armature 50 of the sending machine bends and brings the points 72—73 together, it cuts no figure, because the local printing circuit has already been closed at 34—35 by the manual depression of the key.

From the foregoing it is seen that the function of the polarized relays 3—3' is to receive the delicate initial main line impulses of either positive or negative polarity, depending on which direction the current flows through the main line, and transfer their action to the strong local battery, thereby producing local current impulses of the same polarity and duration as the main line impulses, but of one intensity; the main line current impulse being of two strengths, the first part of the impulse being weak in intensity and acting upon the receiving relay to close its local battery circuit by way of a circuit through the positioning fields 9—9' of the receiving machine, so as to place the type segment in position to print the proper character. The last part of this same main line impulse is strong in intensity, and acts upon the receiving relay to close an additional or shunt circuit (through contacts 72'—73') from the local battery to the printing magnet in the receiving instrument.

The machine operates entirely by local battery current and with exception of keyboard has no electrical connection whatsoever with the main line or source of main line energy. The keyboard directly controls the main line and to a limited extent the local battery currents. The main line currents are used only to control the action of the relays, and the relays directly control the action of the local battery currents, while the local battery currents control the electrical operation of the machine.

By the use of positive and negative impulses, the printing plate 6 and universal type-bar 5 are so arranged that the normal position of the printing plate 6 in relation to the platen is such that its center is always normally presented to the platen, and the arm 7 stands over the central neutral section of the commutator segment. This arrangement is preferred for the reason that the distance to be traveled by the printing plate 6 in coming to any desired character is short as compared with starting the type segment at one end and causing all movements of the type segment to be in one direction. This results in a great saving in time in positioning the printing plate, since its travel is approximately only one-half what it would be if impulses of one polarity were used and the printing plate 6 always swung in one direction from one end of the segment 8. The type segment or printing plate 6 and arm 7 are held in normal central position by suitable means, as the springs 80, and the field magnets 9—9' act in opposition to these springs. The relay armatures 50 are maintained normally out of contact with the switch members 52—53, 73—75 by suitable means, as the springs 81. The type characters, as shown in Fig. 8, are mounted upon the type-face plate 6 in three horizontal rows, the top row forming the "lower case" of characters which are normally presented in printing position in front of the platen 12. The capital letters form the central or second row, and the figures, punctuation marks, etc., form the third or lower row;

the characters being equidistant apart corresponding with the commutator sections 40. The characters in the three rows are arranged also in vertical series. The type-face is left blank at the center or normal position of the type segment to allow for spacing by means of the spacing-key 49, because it will be seen hereinafter that whenever the spacing-key 49 is struck, the type-bar 5 will rock forward on its pivots 48. The arrangement of characters to the right and left of normal line position on the type-face, is such that the most frequently used characters have the shortest distance to travel, while other characters, like "q"—"x"—"z," most infrequently used, are mounted toward the outer ends of the type-face plate. Starting with the normal central position of the type segment, the characters on one side of the center are selected by keys on the keyboards giving positive line impulses, and those characters on the other side are selected by keys on the keyboard giving negative impulses.

As before stated, the impulses on the line and in the local or field magnet circuit are variable in length, according to the character selected. The nature of these main line and local or field magnet circuit impulses showing duration and strength is graphically illustrated in Figs. 12 and 13. The shortest impulse is for the selection of the character on the type-plate that is nearest to the vertical central blank space on the type-plate, either to right or left, according to the polarity of the impulse; the longest impulse used is for the characters at the extreme ends of the type-plate. Figs. 12 and 13 graphically represent the type-plate divided by longitudinal parallel lines into time units; the horizontal lines representing the comparative duration of the impulses to produce the various characters. In Fig. 12, the weak initial portion of the main line impulse is represented by the narrower horizontal figures 82, while the stronger later portion of this main line impulse is represented by the thickened portions 83. The first or weaker part of the main line impulse is variable in length, according to the position of the type on the type-face, whether nearer to, or farther from, the center of the type-plate; but the intensified, or printing portion of the main line impulse, represented at 83, is of uniform length for all the characters. In Fig. 13, the horizontal lines 84 show the local field magnet circuit impulses of uniform strength, but of variable length; the cross-hatched portion 84' corresponding to the local printing or shunt circuit through magnets 11—11'. The increase of strength in the main line always comes at the latter end of the impulse, and is but momentary and of fixed length, for the reason that this last part of the impulse is used only to excite the printing magnet 11—11', through the relay, to action. In other words, the weak portion of the main line current corresponds to the time that it takes the arm 7 to swing over the segment 8 to the section 40 which corresponds to the key depressed; and the strong part of the main line current, represented by 83, Fig. 12, corresponds to the time that it takes the printing bar 5 to rock forward on its pivots 48 and print, after the arm 7 has come to the correct section 40. The local or shunt printing circuit is energized at the same moment as the main line impulse is intensified, or as nearly so as the adjustment of the relay contacts 72—73 can be made to give this result. The neutral non-printing portion on the type-plate is represented by the central vertical space 85, Figs. 12 and 13.

The detail construction of the type-bar is more particularly shown in Figs. 4, 5, 6 and 7. As seen in Figs. 3 and 5, the lower end of the type-bar 5 pivots on an adjustable set-screw 86 which is carried by the rocking frame 87 which pivots on the pins 48. The frame 87 has a tubular upward extension 88 through which the rod 5 passes, being turnably supported on ball bearings 89, Fig. 5. The printing or type-plate 6 is carried on an arm 90 which turns with the type-bar 5, but is free to slide lengthwise thereon; a spline or equivalent connection on the bar 5 fitting a corresponding keyway in the hub of the arm 90. The type-bar 5 has a sidewise turning movement in the frame 87—88 and independent of the latter, and has also a rocking movement in unison with the frame 87—88, while the type segment 6 and its carrying arm 90 has, in addition to these two movements, an up and down or vertical movement corresponding with the operation of the shift-key 45 to shift the type segment to bring one or other of the cases in printing position with respect to the platen 12, as will be shortly described. The armatures 10 are supported on the type-bar 5 so that the latter will swing in unison with the armatures, as shown in Fig. 5, and the arm 7 has a pivotal yoke connection 91 with the bar 5; a spring 92, Fig. 5, carried by arm 7, pressing against a suitable stop, as an armature 10, to keep the brushes 46—47 in contact with the commutator segment 8.

The shifting mechanism for the type segment 6 is shown more particularly in Fig. 6. Normally the type segment 6 stands with its top row, carrying the most used characters, opposed to the platen, so that whenever a character key 2 is struck, a type in this top row will imprint on the paper on the platen. To obtain a character in the central or lower row it is necessary to raise the type segment either one or two steps upward, respectively. This is accomplished by pressing the shift-key 45, Figs. 1 and 3.

This key 45 actuates an electric shift device, Fig. 6, that sets up and locks the type segment in the following described manner: Whenever the shift-key 45 is depressed, the field magnets 9—9' are energized so as to swing the arm 7 to the right and bring the brushes 46—47 over the end sections 42'—43' of the segment 8. The sections 42'—43' are insulated from each other, and one of these sections is connected by a wire 93, Fig. 6, with one pole of the shift-mechanism operating-magnet 94. The other pole of this magnet is connected with one pole of the local battery 38 by a wire 95, and the other pole of the local battery 38 is connected by a wire 96 with the other commutator section 42'. When the brushes 46—47 swing on to the sections 42'—43', these brushes act as a circuit closer to close the local circuit through the magnets 94. Energizing magnet 94 pulls down on an armature arm 97 which carries a spring-actuated dog 98 adapted to engage a notch 99 on a rack-bar 100 which is connected with the hub 101 of the printing plate carrying arm 90. Reciprocating the rod 100 causes a like reciprocation of the hub 101 on the type-bar 5, and a corresponding raising or lowering of the printing plate 6 without any lengthwise movement of the bar 5, the rack 100 being suitably guided in the frame 87—88 and rocking with the frame; the connection between the rack-bar 100 and hub 101 being loose, so as to allow the hub and type-plate 6 to turn sidewise independent of the rack-bar 100. A single impulse through the magnet 94 results in one step up of the rack-bar 100. Lifting the rack-bar one step causes a spring dog 102 to engage a notch 103 on the rack-bar to hold the latter in elevated position. A second impulse, due to a second depression of the shift-key 45, results in a second step up of the bar 100, thereby bringing the lower case on the printing plate 6 into printing position, and the plate and rack-bar 100 are held up by the dog 102 catching in a second notch 104. The dog 102 is pivoted between its ends, as shown in Fig. 6, and a spring 105 acts normally to press one end of the dog into the path of the notches 103—104. The other end of the dog is in line with a sliding automatic release-bar 106. This bar 106 has two notches 107 engageable by a little spring detent 108. After printing the character the type segment is automatically released and drops to initial low position by the return of the universal type-bar to a vertical position through the medium of this automatic releasing bar 106. Bar 106 has a pin 109 engaged by the forked end of an arm 110 carried by the rocking frame 87. When the type-bar and frame 87—88 rock forward to print, the rack-bar 100 and locking dog 102 rock forward in unison with the frame 87—88, and the arm 110 pulls the releasing bar 106 outward so as to cause it to catch in one or other of the notches 107. When the frame 87—88 rights itself, it leaves the bar 106 sticking out so that it hits the spring end of the dog 102 and rocks it, thereby releasing the rack-bar 100 so that a spring 111 can pull the rack-bar and type-plate 6 down again to initial position.

In order to obviate noise and prevent shock when the frame and type-bar return to initial position, I employ a shock-absorbing spring 112, Fig. 6, which is adjustably acted upon by a set-screw 113.

In order to lock the type-plate when printing, and insure proper alinement of the type, I employ a segmental locking-plate 114 which is fixed to a hub 101ª on bar 5, and turns with the type segment 6, and is of about one-half inch shorter radius than the type segment. The peripheral edge of this locking-plate 114 is serrated, or suitably formed with V-shaped notches, which latter conform in their position to the vertical rows of type on the type segment. Directly and centrally in front of this plate at a point approximately coinciding with the normal position of the type segment is a stationary vertical pin 115 also V-shaped in cross-section, corresponding with the V-shaped notches in locking-plate 114. This pin is placed about one-sixteenth of an inch from the peripheral edge of the notched plate when the type-bar stands vertical and in non-printing position, so that when the plate is oscillated horizontally the pin offers no obstruction to this free lateral movement. However, the moment that the local battery circuit, before described, has closed, through the brushes 46—47 and the commutator segment 40, so as to oscillate the frame 87—88 to print, the notched plate 114 is also tilted forward and the notch in the peripheral edge of the plate corresponding to the character on the key depressed on the keyboard is brought into engagement with the stop-pin 115, thus arresting and locking the universal type-bar and preventing further lateral motion of the type segment 6. The inclined surfaces of the notches and pin 115 operate to insure perfect alinement of the characters when printing and also to correct small differences in the synchronous movement of the type segments. Between the convexed surface of the type-plate 6 and the platen roll is removably fixed a concaved velvet ink-pad 116, Figs. 7 and 8, normally separated from the type-face. The center of the ink-pad corresponding to the central or normal position of the type segment is fitted with a resilient piece of celluloid 117 or other suitable springy material, in the center of which is a square hole 118 just large enough to allow the free passage of a type, so that the type protruding there-through will strike the paper on the platen and print whenever the type segment is rocked forward. This forward motion of the type segment also accomplishes the inking of the types by bringing the convexed type-face into contact with the concaved inking-pad.

119 is the carriage which carries the platen roll, and this carriage is suitably mounted for reciprocation so as to cause the platen roll to traverse the type-face, and its movement in one direction is accomplished by any suitable means well-known in the art and hereinafter explained. As here shown, the carriage is operated in one direction by means of a spring drum 150, Fig. 4, to the interior of which is connected one end of a tape 151; the opposite end being attached to the carriage. Secured to the carriage is a rack 152 into which meshes a pinion 153 upon the vertical shaft 154, near the lower end of which latter is an escapement-wheel 155 providing for step by step movement. The controlling means consists of a duplex dog 156, one member of which 156' is rigid on the vertically movable shaft 157; the moving member being located above the fixed member and loosely pivoted on the vertically moving shaft 157; and by said vertical movement the pivoted dog is shifted out of contact with the teeth of the escapement-wheel 155 and advanced one tooth through the action of a spring 158. The vertical moving shaft 157 is held against rotation and is operative in both directions by means of a bell-crank 159 and link connection 160 to the rocking frame 87, the spring 161 surrounding the shaft serving to hold the same down. Thus each time the type-bar and its frame rocks back to normal upright, from forward printing or spacing position, the dog 156 is shifted to allow the carriage to progress one step movement to the left. The carriage-return movement is accomplished by the depressing of a spécial carriage-return-key 120 at the left-hand side of the keyboard. Depressing key 120 results in energizing the field magnets 9—9' in the manner previously described, to cause the arm 7 to swing to its limit to the left and bring the brushes 46—47 over the commutator sections 42—43.

As shown in Fig. 10, bridging the gap between the sections 42—43 by the brushes 46—47 closes a circuit to the motor 44; section 42 being connected by a wire 121 with one pole of the motor, the other pole of the motor being connected by a wire 122 with one member 123 of a normally closed switch. The other member of this switch is connected by a wire 124 with the local battery 38. The armature of the motor is mounted on the motor shaft 125, which shaft and armature have a limited lengthwise movement within the field of the motor. The armature is so positioned with respect to the field that when the field is energized it will so react on the armature that the latter is drawn into central position in the field, causing the armature to shift from the full line, or normal inert position, Fig. 10, to the dotted line, or active position of the rotating parts. This will cause a corresponding lengthwise shifting of the motor shaft 125. Shaft 125 carries a broad gear 126 meshing a gear 127 which is mounted loose on a counter-shaft 128, being yieldingly held thereto by means of a spring 129 which has one end secured to the loose gear 127, and the other end fixed to the shaft 128, Fig. 11. Thus it is seen that motion is transmitted from gear 127 to shaft 128 through the medium of the spring 129. Splined on to the shaft 128 is a clutch collar 130 which turns with the shaft and slides lengthwise on it and is operated by lever 131 fulcrumed at 132 and loosely connected with the shaft 125, so that the lever 131 is moved back and forth corresponding with the lengthwise movement of the shaft 125, to carry the clutch member 130 into and out of engagement with a corresponding clutch member 133 which is loose on shaft 128 and carries a pinion 134 meshing a rack 135 on the platen carriage 119. The carriage 119 has a rail 136 on which an adjustable trip or cam 137 is adapted to contact with the bell-crank switch member 123 and interrupt the motor circuit, so as to cut out the motor and stop the further return movement of the carriage.

The operation of the carriage-return is as follows: Depressing the carriage-return-key 120 causes the arm 7 to swing to the left and bring the brushes 46—47 over the commutator sections 42—43. Assuming that the carriage 119 is moved to the left, so that the cam or trip 137 is out of engagement with the switch member 123, this switch member 123 is then in closed position by reason of the action of the spring 138 to close the motor circuit at this point. The brushes 46—47 close the motor circuit across the sections 42—43. The moment the field of the motor is energized the armature is pulled to the right into central position with respect to the field, shifting the shaft 125 to the right, rocking lever 131, and throwing in the clutch 130—133. This endwise movement of the shaft 125 has the further function of closing a shunt circuit through the switch members 139 and wires 140—141 which lead around the sections 42—43. This shunt circuit is for the purpose of keeping the motor circuit closed after the pressure is released on the carriage-return-key 120, because the moment the key 120 is released, arm 7 swings back to central neutral position, uncovering sections 42—43. Setting the motor in motion causes the shaft 128 to revolve, and the gear 134 acts on the rack 135 to wind the carriage back to the right, or until the cam or detent 137 on the carriage comes into engagement with the switch lever 123 mounted on the frame independent of the lever and carriage. As soon as the cam 137 hits the switch lever 123 the motor circuit is interrupted at this point, thereby shutting off the motor, and a spring 142 acts on lever 131 to throw out the clutch 130 and return the armature to initial full line position, shown in Fig. 10. The cam or trip 137 is adjustably mounted on the rod 136 so that it can be slid along the same and clamped wherever desired to break the circuit and stop the carriage-return. Of course, the moment the clutch 130 is thrown out, the shunt circuit through 140—141 is interrupted, and the motor is not started up again until the switch arm 123 is again in contact with its button, and the brushes 46—47 are brought over the sections 42—43. The spacing is controlled from the key 49 in a precisely similar manner as the regular keys on the keyboard, the section 40 which it controls being central of the commutator segment 8 so that there is no sidewise oscillating movement of the arm 7, but there is a forward and back rocking movement of the universal type-bar 5 and its frame 87—88. No printing takes place, however, when the bar 49 is depressed, for the reason that the center of the type segment 6 is blank, as previously described.

Briefly, the operation of the machine, when manually operated, is as follows: The switches 13—14 are first set to the transmitting position in the sending machine, and to the receiving position in the receiving machine, represented, respectively, at left and right of Fig. 2. Pressing a left-hand key 2 starts a positive current impulse to the line through the coils of the relays 3—3', which relays 3—3' in turn move their armatures 50—50' and bring the spring tongues 51—51' of the same into contact with the local battery of each machine, so that a positive current flows from the local battery, energizing simultaneously the positioning fields 9—9' of both machines, swinging both type segments 6 in unison to the required position, when automatically a contact is made in the transmitting machine by means of the traveling brushes 46—47 through a section 40 and the back section 41 of the commutator 8, resulting in the establishing of a circuit from the local battery 38 to the printing magnet 11 and energizing the same. Instantly the light armature 63 of the sending machine is attracted, which acts to cut in the extra set of cells 64 in the main line battery, thereby increasing the pressure or tension of the current impulse already flowing on the line. This extra tension acts on the armatures of the relays to further move the same, bending their tongues 51—51' sufficiently to allow the additional contact 72 in both machines to come into contact with the contact screw 73 in both machines. This allows the current to flow from the local battery in the receiving machine by a shunt circuit to the printing magnets 11, energizing the same and simultaneously printing in unison with the transmitting machine. Depressing the shift-key 45 once, will lift the printing plate 6 one step to print capitals or other characters on the middle case, and depressing the key 45 twice in succession, will lift the printing plate 6 two steps, so as to print from the lower case. To return the carriage, after completing its travel to the left, depress key 120 which swings the arm 7 to the left, bringing the brushes 46—47 over the sections 42—43 and cutting in the motor. The motor circuit is maintained then automatically by means of the switches 139 until the cam 137 on the carriage strikes a switch lever 123 and cuts out the motor.

It is manifest or possible that the construction herein specified may be varied without departing from the principle of the invention, and I desire it to be understood that the invention is not limited to any specific form or arrangement of parts, except in so far as such limitations or their mechanical equivalents are specified in the claims.

Having thus described my invention, what I claim and desire to secure by Letters Patent is—

1. In a printing telegraph, the combination with a sending and receiving machine, of a main line wire, a polarized relay at each end of the line, a local circuit in the sending machine controlled by the relay at that end, and a local circuit in the receiving machine controlled by the relay at that end, printing mechanism in said local circuits, each of said printing mechanisms including a horizontally oscillating printing plate, a vertical shaft upon which said plate is rockable from side to side of its center, said printing plates each having a rocking movement transversely of their paths of oscillation, a key board for each machine, and electrically operated mechanism controlled by a key for successively oscillating and rocking a corresponding printing plate, said last-named mechanism comprising a single character printing magnet common to all the characters to be printed and acting directly upon the printing shaft carrying the printing plate and arranged in a single common circuit.

2. In a printing telegraph, the combination with a sending and receiving machine, of a main line wire, a polarized relay at each end of the line, a local circuit in the sending machine controlled by the relay at that end, and a local circuit in the receiving machine controlled by the relay at that end, printing mechanisms in said local circuits, a keyboard for each machine, and selective mechanism for each keyboard and its printing mechanism whereby on the depression of a particular key in one machine the proper character will be made to print in the other machine, said selective mechanism in the receiving machine controlled by a two-strength main line current.

3. In a printing telegraph, the combination of a sending mechanism, a receiving mechanism, a main line connecting the sending and receiving mechanisms, each of said mechanisms including a horizontally oscillating printing plate, a vertical shaft upon which said plate is mounted and rockable back and forth to one side or the other of its center, each of said plates having, also, a movement transverse to its plane of oscillating movement, and electrical mechanism controlled by a key in one machine for oscillating and rocking both of the printing plates synchronously, said last-named mechanism comprising a single character printing magnet common to all the characters to be printed and acting directly upon the shaft carrying the printing plate, and arranged in a single common circuit.

4. In a printing telegraph, the combination of a sending mechanism and a receiving mechanism, a main line connecting the two mechanisms, said mechanisms each including a horizontally oscillating printing plate, each of said plates also having a movement transverse to its plane of oscillation, electrical mechanism controlled by a key in one machine for oscillating and rocking both of said printing plates synchronously, means for sending two-strength impulses over the main line, means by which one strength of said main line impulse prepares the system for printing and means by which the other strength of said main line impulse effects the printing.

5. In a printing telegraph, the combination of two printing mechanisms remotely situated from each other, each of said mechanisms having a horizontally oscillating printing plate, each of said plates also having a movement transverse to its plane of oscillation, a main line circuit, relays at the ends of said main line circuit, local circuits connected with said relays and in which local circuits said printing plates are interposed, said printing plates oscillating and rocking in unison, means for sending impulses of two-strengths over the main line, means by which one strength prepares the system for printing, and means by which the other strength effects the printing.

6. In a printing telegraph, the combination of two printing mechanisms remotely situated from each other, a main line circuit, relays at the ends of said main line circuit, local circuits connected with said relays and in which local circuits said printing mechanisms are interposed, said printing mechanisms each comprising a printing plate having a sidewise rocking motion and also a motion in a vertical plane, means for sending an impulse of two strengths over the main line, means by which the first or initial strength rocks the printing plates sidewise in unison, and means by which the second strength rocks the printing plates in vertical planes.

7. In a printing telegraph, the combination of two printing mechanisms remotely situated from each other, a main line circuit, relays at the ends of said main line circuits, local circuits connected with said relays and in which local circuits said printing mechanisms are interposed, said printing mechanisms each comprising a printing plate having a sidewise rocking motion and also a motion in a vertical plane, means for sending an impulse of positive or negative character over the line, means by which on the sending of a positive impulse said printing plates rock in one direction sidewise, and in an opposite direction when a negative impulse is sent, means for intensifying a portion of the impulse sent over the main line, and means by which the intensified portion of said impulse will operate to rock the printing plates in vertical planes.

8. In a printing telegraph, the combination of a sending machine and a receiving machine, a main line between the machines, each of said machines having a horizontally oscillating printing plate, each of said plates also having a movement transverse to its plane of oscillation, a sending key, electrical mechanism controlled by a key in one machine for oscillating and rocking both of said printing plates synchronously, said last named means being operated by a current of two strengths.

9. In a printing telegraph, the combination of a sending machine, a receiving machine, a main line connecting the two machines, relays in the main line, a local circuit in the sending machine controlled by its relay, a local circuit in the receiving machine controlled by its relay, a sending key, means operated by the key for sending an initial impulse over the main line, and other means independent of the key for intensifying the latter part of said impulse.

10. In a printing telegraph, the combination of a sending key, a main line circuit, means controlled by the key for establishing a circuit of one strength, and means connecting subsequent to the operation of said key to intensify the impulse in the circuit established by said key without breaking the main line circuit.

11. In a printing telegraph, the combination of a key, a main line circuit, two switches in said circuit controlled by said key, means for closing the switches on the depression of the key, a local circuit controlled by the main line circuit, and means controlled by the local circuit for intensifying the impulse in the main line initiated on the depression of said key.

12. In a printing telegraph, the combination of a key, a main line circuit, means by which on the depression of the key an impulse is sent over the main line circuit, a local circuit controlled by the main line circuit, and means controlled by the local circuit for intensifying the impulse in the main line initiated by the depression of said key.

13. In a printing telegraph, the combination of a sending machine and a receiving machine, a main line circuit, a key on the sending machine, a local circuit in each machine controlled by the main line circuit, printing mechanism controlled by the local circuit in the receiving machine, means by which on the depression of the key an impulse is sent over the main line circuit, means controlled by the local circuit of the sending machine for intensifying the main line impulse initiated by the depression of said key, and means by which on the intensification of the impulse over the main line the local circuit in the receiving machine actuates said printing mechanism.

14. In a printing telegraph, the combination of a sending machine and a receiving machine, each machine comprising a universal sidewise-oscillating and vertically-rocking type-bar, type-face on each type-bar, a keyboard on the sending machine, commutator segments in each machine having sections corresponding to the keys of said keyboard, a brush carried by each type-bar and movable over its respective commutator segment, electrical connections and means whereby on the depression of a key on said keyboard the brushes are moved synchronously over the respective commutators into position over a commutator section corresponding to the key depressed, and electrical means acting subsequently to rock the type-bars in vertical planes to cause the type to print.

15. In a printing telegraph, the combination of a sending machine and a receiving machine, each machine comprising a universal sidewise-oscillating and vertically-rocking type-bar, type-face on each type-bar, a keyboard on the sending machine, commutator segments in each machine having sections corresponding to the keys of said keyboard, a brush carried by each type-bar and movable over its respective commutator segment, electrical connections and means whereby on the depression of a key on said keyboard the brushes are moved synchronously over the respective commutators into position over a commutator section corresponding to the key depressed, and electrical means acting subsequently to rock the type-bars in vertical planes to cause the type to print, said last-named means including a main line impulse of variable intensity.

16. In a printing telegraph, the combination of a sending machine and a receiving machine, each machine comprising a universal sidewise-oscillating and vertically-rocking type-bar, type-face on each type-bar, a keyboard on the sending machine, commutator segments in each machine having sections corresponding to the keys of said keyboard, a brush carried by each type-bar and movable over its respective commutator segment, electrical connections and means whereby on the depression of a key on said keyboard the brushes are moved synchronously over the respective commutators into position over a commutator section corresponding to the key depressed, and electrical means acting subsequently to rock the type-bars in vertical planes to cause the type to print, said last-named means including a main line impulse of variable intensity, and a local circuit impulse of uniform intensity.

17. In a printing telegraph, the combination of a sending machine and a receiving machine, each machine comprising a universal sidewise-oscillating and vertically-rocking type-bar, type-face on each type-bar, a keyboard on the sending machine, commutator segments in each machine having sections corresponding to the keys of said keyboard, a brush carried by each type-bar and movable over its respective commutator segment, electrical connections and means whereby on the depression of a key on said keyboard the brushes are moved synchronously over the respective commutators into position over a commutator section corresponding to the key depressed, and electrical means acting subsequently to rock the type-bars in vertical planes to cause the type to print, said last-named means including a main line impulse of variable duration and variable intensity.

18. In a printing telegraph, the combination of a sending machine and a receiving machine, each machine comprising a universal sidewise - oscillating and vertically-rocking type-bar, type-face on each type-bar, a keyboard on the sending machine, commutator segments in each machine having sections corresponding to the keys of said keyboard, a brush carried by each type-bar and movable over its respective commutator segment, electrical connections and means whereby on the depression of a key on said keyboard the brushes are moved synchronously over the respective commutators into position over a commutator section corresponding to the key depressed, and electrical means acting subsequently to rock the type-bars in vertical planes to cause the type to print, said last-named means including a main line impulse varying in duration according to the distance traveled by the brush, and said impulse being weaker during the period of travel of the brush and stronger during the printing operation.

19. In a printing telegraph, the combination of a sending machine and a receiving machine, each machine comprising a universal sidewise-oscillating and vertically-rocking type-bar, type-face on each type-bar, a keyboard on the sending machine, commutator segments in each machine having sections corresponding to the keys of said keyboard, a brush carried by each type-bar and movable over its respective commutator segment, electrical connections and means whereby on the depression of a key on said keyboard the brushes are moved synchronously over the respective commutators into position over a commutator section corresponding to the key depressed, and electrical means acting subsequently to rock the type-bars in vertical planes to cause the type to print, said last-named means including a main line impulse varying in duration according to the distance traveled by the brush, said impulse being weaker during the period of travel of the brush and stronger during the printing operation, a local circuit in the receiving machine excited by the intensified portion of said main line impulse, and a printing magnet acting on the type-bar of the receiving machine in said local circuit.

20. In a printing telegraph, the combination of a sending machine and a receiving machine, said sending machine including a universal sidewise-oscillating, vertically-rocking type-bar, type-face carried by the type-bar, an arm rocking sidewise in unison with the type-bar and carrying a brush, a keyboard, a commutator segment divided into sections corresponding to the keys on the keyboard and over which sections said brush travels, a main line circuit controlled by the key, a local circuit controlled jointly by the key and main line circuit, a printing magnet in the local circuit operative on the type-bar to rock it in a vertical plane, and means for operating the receiving machine synchronously with the operation of the sending machine on the depression of a key.

21. In a printing telegraph, the combination of a sending machine and a receiving machine, said sending machine including a universal sidewise-oscillating, vertically-rocking type-bar, type-face carried by the type-bar, an arm rocking sidewise in unison with the type-bar and carrying a brush, a keyboard, a commutator segment divided into sections corresponding to the keys on the keyboard and over which sections said brush travels, a main line circuit controlled by the key, a local circuit controlled jointly by the key and main line circuit, a printing magnet in the local circuit operative on the type-bar to rock it in a vertical plane, and means for operating the receiving machine synchronously with the operation of the sending machine on the depression of a key, said last-named means including main line impulses of variable intensity.

22. In a printing telegraph, the combination of a sending machine and a receiving machine, said sending machine including a universal sidewise-oscillating, vertically-rocking type-bar, type-face carried by the type-bar, an arm rocking sidewise in unison with the type-bar and carrying a brush, a keyboard, a commutator segment divided into sections corresponding to the keys on the keyboard and over which sections said brush travels, a main line circuit controlled by the key, a local circuit controlled jointly by the key and main line circuit, a printing magnet in the local circuit operative on the type-bar to rock it in a vertical plane, and means for operating the receiving machine synchronously with the operation of the sending machine on the depression of a key, said last-named means including main line impulses of variable duration and variable intensity.

23. In a printing telegraph, the combination of a sending machine and a receiving machine, said sending machine including a universal sidewise-oscillating, vertically-rocking type-bar, type-face carried by the type-bar, an arm rocking sidewise in unison with the type-bar and carrying a brush, a keyboard, a commutator segment divided into sections corresponding to the keys on the keyboard and over which sections said brush travels, a main line circuit controlled by the key, a local circuit controlled jointly by the key and main line circuit, a printing magnet in the local circuit operative on the type-bar to rock it in a vertical plane, and means for operating the receiving machine synchronously with the operation of the sending machine on the depression of a key, said last-named means including main line impulses of two strengths, the initial strength corresponding to the travel of the brush over the commutator sections, and the other strength corresponding to the period that it takes the type-bar to rock vertically to print after the brush comes over a section corresponding to the key depressed.

24. In a printing telegraph, the combination of a sending machine and a receiving machine, said sending machine including a universal sidewise-oscillating, vertically-rocking type-bar, type-face carried by the type-bar, an arm rocking sidewise in unison with the type-bar and carrying a brush, a keyboard, a commutator segment divided into sections corresponding to the keys on the keyboard and over which sections said brush travels, a main line circuit controlled by the key, a local circuit controlled jointly by the key and main line circuit, a printing magnet in the local circuit operative on the type-bar to rock it in a vertical plane, and means for operating the receiving machine synchronously with the operation of the sending machine on the depression of a key, said last-named means including main line impulses of two strengths, the initial strength corresponding to the travel of the brush over the commutator sections, and the other strength corresponding to the period that it takes the type-bar to rock vertically to print after the brush comes over a section corresponding to the key depressed, said initial strength of the main line impulse being of variable duration, and the other strength being of uniform duration.

25. In a printing telegraph, the combination of a sending machine and a receiving machine, said sending machine including a universal sidewise-oscillating, vertically-rocking type-bar, type-face carried by the type-bar, an arm rocking sidewise in unison with the type-bar and carrying a brush, a keyboard, a commutator segment divided into sections corresponding to the keys on the keyboard and over which sections said brush travels, a main line circuit controlled by the key, a local circuit controlled jointly by the key and main line circuit, a printing magnet in the local circuit operative on the type-bar to rock it in a vertical plane, and means for operating the receiving machine synchronously with the operation of the sending machine on the depression of a key, said last-named means including a shunt circuit in the main line, said shunt circuit controlled by said printing magnet for intensifying the main line impulse initiated by said key, and an extra main line battery controlled by said shunt circuit.

26. In a printing telegraph, the combination of a key, a circuit closer electrically insulated from the key and controlled by the key, a main line circuit opened and closed by said circuit closer, printing mechanism, means by which the main line circuit which is controlled by said circuit closer prepares said mechanism for printing, and a local circuit in series with the key for operating the printing mechanism so prepared.

27. In a printing telegraph, the combination of a main line, a key, a circuit closer, two switches in the main line operated by the circuit closer, a local circuit in series with the key, and printing mechanism operable through the joint action of the main line and local circuit, said printing mechanism comprising a sidewise-oscillating and vertically-rocking type-bar and a commutator segment having an insulated section in series with said local circuit.

28. In a printing telegraph, the combination of a main line, a key, a circuit closer, two switches in the main line operated by the circuit closer, a local circuit in series with the key, and printing mechanism operable through the joint action of the main line and local circuit, said printing mechanism including a sidewise-oscillating and vertically-rocking type-bar, a commutator segment having an insulated section in series with the local circuit, and an arm carried by the type-bar and having a local cricuit-closing device movable through the medium of the main line battery into electrical connection with said commutator section.

29. The combination of a sidewise-oscillating and vertically-rocking type-bar, a keyboard, a commutator segment divided into insulated sections, each section adapted to be electrically connected with a key on the keyboard, an arm on the type-bar carrying a brush swinging over the sections, field magnets, armatures movable sidewise in unison with the type-bar between said field magnets, an armature rocking vertically in unison with the vertical rocking of the type-bar, printing magnets acting on the last-named armature, and electrical connections controlled by the keys on the keyboard for energizing said magnets, said last-named means including a main line, and means operative by the printing magnets to intensify the main line impulse initiated by a key.

30. The combination of a sidewise-oscillating and vertically-rocking type-bar, a keyboard, a commutator segment divided into insulated sections, each section adapted to be electrically connected with a key on the keyboard, an arm on the type-bar carrying a brush swinging over the sections, field magnets, armatures movable sidewise in unison with the type-bar between said field magnets, an armature rocking vertically in unison with the vertical rocking of the type-bar, printing magnets acting on the last-named armature, and electrical connections controlled by the keys on the keyboard for energizing said magnets, said last-named means including a main line, a source of electrical energy for the main line, a shunt circuit in the main line, an additional source of energy controlled by said circuit, and means controlled by one of said magnets acting through said shunt circuit to cut said additional source of energy into the main line subsequent to the energizing of the field magnets.

31. In a printing telegraph, the combination of a sending machine, a receiving machine, a single line wire connecting the two machines, each of said machines including a horizontally oscillating printing plate, a vertical shaft upon which said plate is mounted and rockable back and forth to one side or the other of its center, and each of said plates having, also, a movement transverse to its plane of oscillating movement, and electrically operated mechanism having a single character magnet common to all the characters to be printed acting directly upon the printing shaft carrying the printing plate and arranged in a single common circuit.

In testimony whereof I have hereunto set my hand in the presence of two subscribing witnesses.

GEORGE C. CLARK.

Witnesses:
 RAYMOND A. LEONARD,
 CHARLES HOULSON.